United States Patent
Dalsgaard et al.

(10) Patent No.: US 11,432,178 B2
(45) Date of Patent: Aug. 30, 2022

(54) IMPROVING IDLE MODE RADIO MEASUREMENTS

(71) Applicant: Nokia Technologies Oy, Espoo (FI)

(72) Inventors: Lars Dalsgaard, Oulu (FI); Tero Henttonen, Espoo (FI); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/979,743

(22) PCT Filed: Mar. 26, 2019

(86) PCT No.: PCT/FI2019/050247
§ 371 (c)(1),
(2) Date: Sep. 10, 2020

(87) PCT Pub. No.: WO2019/197711
PCT Pub. Date: Oct. 17, 2019

(65) Prior Publication Data
US 2021/0045000 A1     Feb. 11, 2021

Related U.S. Application Data

(60) Provisional application No. 62/657,566, filed on Apr. 13, 2018.

(51) Int. Cl.
*H04W 24/10* (2009.01)
*H04W 76/10* (2018.01)
*H04W 72/04* (2009.01)

(52) U.S. Cl.
CPC ......... *H04W 24/10* (2013.01); *H04W 72/048* (2013.01); *H04W 72/0453* (2013.01); *H04W 76/10* (2018.02)

(58) Field of Classification Search
None
See application file for complete search history.

(56) References Cited

U.S. PATENT DOCUMENTS 11,115,850 B2 * 9/2021 Xiong ................ H04W 72/048
2011/0243005 A1 10/2011 Sun
(Continued)

FOREIGN PATENT DOCUMENTS

| EP | 2942996 A1 | 11/2015 |
| WO | 2012/095113 A1 | 7/2012 |

(Continued)

OTHER PUBLICATIONS

Office action received for corresponding Japanese Patent Application No. 2020-554503, dated Nov. 10, 2021, 8 pages of office action and 8 pages of translation available.
(Continued)

*Primary Examiner* — Saba Tsegaye
(74) *Attorney, Agent, or Firm* — Nokia Technologies Oy (57) ABSTRACT

There is provided a method at a user equipment, comprising: determining a first cell to connect with; determining capabilities of the user equipment in relation to carrier aggregation comprising a carrier of the first cell; performing idle mode radio measurements of those carriers that the user equipment can, based on the determined capabilities, aggregate with the carrier of the first cell; and reporting results of the idle mode radio measurements to a network node of the first cell upon connection establishment with the first cell.

18 Claims, 6 Drawing Sheets

(56) References Cited

U.S. PATENT DOCUMENTS

| | | | |
|---|---|---|---|
| 2011/0312328 | A1 | 12/2011 | Choi et al. |
| 2012/0009918 | A1 | 1/2012 | Wu |
| 2017/0303157 | A1* | 10/2017 | Siomina .................. H04W 4/06 |
| 2017/0367073 | A1 | 12/2017 | Murugan et al. |
| 2019/0037634 | A1* | 1/2019 | Kadiri ................... H04W 12/00 |
| 2020/0187208 | A1* | 6/2020 | Hou ...................... H04B 17/318 |

FOREIGN PATENT DOCUMENTS

| | | |
|---|---|---|
| WO | 2015/020108 A1 | 2/2015 |
| WO | 2017/213222 A1 | 12/2017 |

OTHER PUBLICATIONS

"Fast SCell Configuration and Activation Through network assisted RRC_Idle mode measurements", 3GPP TSG-RAN2 Meeting #99, R2-1707788, Agenda : 9.9.2, Qualcomm Incorporated, Aug. 21-25, 2017, 5 pages.

"Details of IDLE mode measurements (IDLE mode)", 3GPP TSG-RAN WG2 #100, R2-1713161, Agenda : 9.9.2, Nokia, Nov. 27-Dec. 1, 2017, 5 pages.

"Fast SCell Configuration through Quick SCell Measurement Reporting", 3GPP TSG-RAN2 Meeting #101, R2-1802073, Agenda : 9.9.2, Qualcomm Incorporated, Feb. 26-Mar. 2, 2018, 8 pages.

"Summary of Enhanced CA Utilization", 3GPP TSG-RAN WG4 #86, R4-1803077, Agenda : 6.25.1, Nokia, Feb. 26-Mar. 2, 2018, 9 pages.

"Way Forward on euCA RRM Requirements", 3GPP TSG-RAN WG4 #86, R4-1803104, Agenda : 6.25, Nokia, Feb. 26-Mar. 2, 2018, 6 pages.

"NRSRP and NRSRQ Measurement Metric Definition", 3GPP TSG-RAN WG4 #86, R4-1802789, Agenda : 6.25.2, Nokia, Feb. 26-Mar. 2, 2018, 9 pages.

International Search Report and Written Opinion received for corresponding Patent Cooperation Treaty Application No. PCT/FI2019/050247, dated May 28, 2019, 15 pages.

"Idle Mode Measurement for euCA" 3GPP TSG-RAN WG4 Meeting #86bis, R4-1805257, Agenda : 6.24.2, Nokia, Apr. 16-20, 2018, 5 pages.

"Faster Idle Mode Measurements", 3GPP TSG-RAN WG2 #99bis, R2-1710996, Agenda : 9.9.2, Nokia, Oct. 9-13, 2017, 17 pages.

"Running RRC CR for euCA", 3GPP TSG-RAN WG2 Meeting #101, R2-1804762, Nokia, Apr. 16-20, 2018, 119 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.1.0, Mar. 2018, pp. 1-786.

Office action received for corresponding Korean Patent Application No. 2020-7032674, dated Dec. 30, 2021, 8 pages of office action and 4 pages of translation available.

"IDLE mode measurement reporting for fast SCell set-up", 3GPP TSG-RAN WG2 #99bis, R2-1710901, Agenda : 9.9.2, KT Corporation, Oct. 9-13, 2017, pp. 1-2.

Extended European Search Report received for corresponding European Patent Application No. 19785556.2, dated Mar. 7, 2022, 10 pages.

"Configuration of IDLE mode measurements", 3GPP TSG-RAN WG2 Meeting #101, R2-1804764, Agenda item: 9.9.2, Nokia, Apr. 16-20, 2018, 5 Pages.

Final Rejection received for corresponding Japanese Patent Application No. 2020-554503, dated Jun. 6, 2022, 6 pages of Final Rejection and 6 pages of translation available.

* cited by examiner

IMPROVING IDLE MODE RADIO MEASUREMENTS

RELATED APPLICATION

This application was originally filed as a Patent Cooperation Treaty Application No. PCT/FI2019/050247 filed on Mar. 26, 2019, which claims priority from U.S. Provisional Patent Application No. 62/657,566 filed on Apr. 13, 2018, which is hereby incorporated in its entirety.

TECHNICAL FIELD

Various example embodiments relate generally to idle mode radio measurements.

BACKGROUND

A user equipment may perform idle mode radio measurements of surrounding environment. Results of the radio measurements may be provided to network. However, such measuring process needs improvements.

BRIEF DESCRIPTION

According some aspects, there is provided the subject matter of the independent claims. Some further aspects are defined in the dependent claims.

LIST OF THE DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN).

The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integradable with existing legacy radio access technologies, such as the LTE.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

Figure 1A:
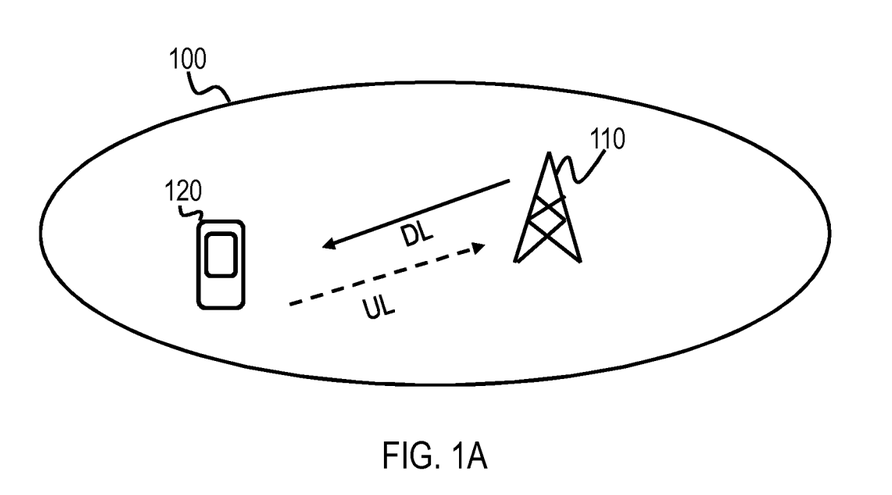
FIGS. 1A and 1B present communication networks, according to some embodiments.

FIG. 1A illustrates an example of a communication system to which embodiments of the invention may be applied. The system may comprise a control node 110 providing a cell 100. Each cell may be, e.g., a macro cell, a micro cell, femto, or a pico cell, for example. In another point of view, the cell may define a coverage area or a service area of the control node 110. The control node 110 may be an evolved Node B (eNB) as in the LTE and LTE-A, ng-eNB as in eLTE, gNB of 5G, or any other apparatus capable of controlling radio communication and managing radio re-sources within a cell. For 5G solutions, the implementation may be similar to LTE-A, or e.g. apply virtualized networks. The control node 110 may be called a base station, network node, or an access node.

The system may be a cellular communication system composed of a radio access network of access nodes, each controlling a respective cell or cells. The control node 110 may provide user equipment (UE) 120 (one or more UEs) with wireless access to other networks such as the Internet. Hence, the control node 110 may also be called an access node. The wireless access may comprise downlink (DL) communication from the control node 110 to the UE 120 and uplink (UL) communication from the UE 120 to the control node 110. Additionally, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within a macro cell. The operation of the local area access node may be controlled by an access node under whose control area the sub-cell is provided.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface Xw may be provided between access points. An interface between an eLTE access point and a 5G access point may be called Xn. Other communication methods between the access nodes may also be possible. The access node 110 may be further connected via another interface to a core network of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and the core network may comprise an advanced mobility management entity (AMF) and a gateway node. The AMF may handle mobility of terminal devices in a tracking area encompassing a plurality of cells and handle signalling connections between the terminal devices and the core network. The gateway node may handle data routing in the core network and to/from the terminal devices.

Figure 1B:
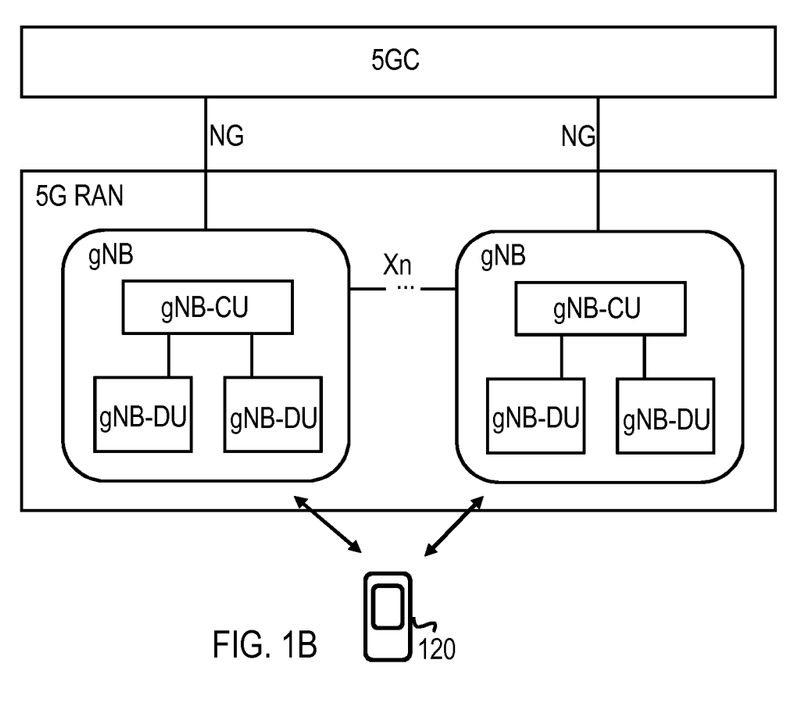

For 5G networks, it is envisaged that the architecture may be based on a so-called CU-DU (central unit-distributed unit) split, where one gNB-CU controls several gNB-DUs, as shown in FIG. 1B. The term 'gNB' may correspond in 5G to the eNB in LTE. The gNBs (one or more) may communicate with one or more UEs 120. As shown in FIG. 1B, the gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer. Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs in the example of FIG. 1B, may be connected to each other via the Xn interface over which the gNBs may negotiate. The gNBs may also be connected over next generation (NG) interfaces to a 5G core network (5GC) 160, which may be a 5G equivalent for the core network of LTE.

Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU. Similar solutions have been considered also for eLTE/EUTRAN, so that eNB or ng-eNB (next generation eNB, i.e. an eNB that is connected to 5GC) might comprise central and distributed units, much like depicted in FIG. 1B for 5G. 3GPP is working on an enhanced utilization of carrier aggregation (euCA). One purpose of the work is to improve CA in LTE by enhancing utilization of secondary cells (SCells) and reduce the latencies for CA. One of the solutions under discussion aims at reducing the CA setup time for a UE entering a connected mode from an idle mode, by enabling early reporting of measurements of cells performed in idle mode. Network would then be able to, based on the reported cells, to configure SCells earlier than currently possible (unless configuration is done blindly without UE measurement report indicating which cell(s) would be appropriate).

The following description uses LTE and enhancing utilization of carrier aggregation (euCA) as a non-limiting example to explain one way the method could be implemented. This should be regarded as an example case. Additionally, the examples exemplify a carrier aggregation (CA) case, but similar method could be applied to dual connectivity (DC) or multi-connectivity (MC) type of communication or alike.

Figure 2:
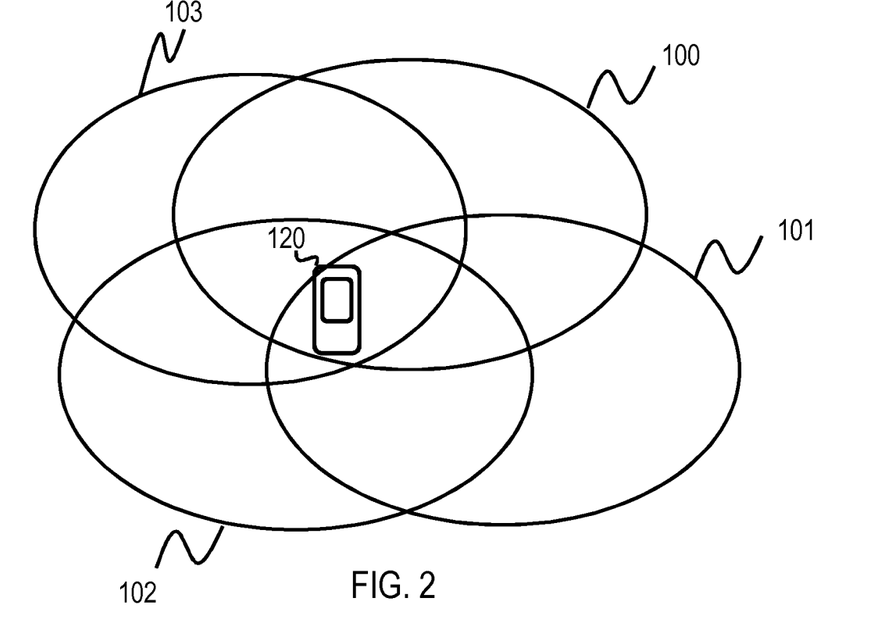
FIG. 2 shows a user equipment being in a coverage area of a plurality of cells.

Let us consider FIG. 2 where the idle mode UE (e.g. UE 120) is under coverage area four cells 100-103 (which may originate from a single access node 120 or from a plurality of collocated or non-collocated access points). In such case, the UE may receive plurality of carriers and therefore may be able to utilize carrier aggregation. Although depicted in FIG. 2 as being cells of same size, the cells may vary in size. E.g. cell 100 may be a macro cell, where others may be smaller cells with possibly higher data rate support, Typically carrier aggregation may be triggered so that the UE first establishes connection to a serving cell (e.g. cell 100). Then the control node 110 of the cell 100 may request the UE 120 to perform radio measurements. These measurements may comprise e.g. reference signal received power (RSRP) measurements or any other measurements that indicate how well (if at all) the UE receives signal from surrounding cells, such as the cells 100-104. Accordingly, the UE may perform the requested measurements and return measurement results to the network. Based on the received measurement result, the network may configure carrier aggregation for the UE, where one or more carriers, in addition to the carrier of the serving cell 100, carries data to the UE 120. The one or more carriers may originate from other cells, such as from one or more of cells 101-103.

To expedite the carrier aggregation setup, it is proposed that already at the connection establishment the UE may send to, the control node 110 of the serving cell 100, results of measurements the UE may have done in the idle mode. Based on those measurements, the control node 110 may become aware which other cells/carriers the UE can receive. Then the control node 110 of the cell 100 may, based on that knowledge, decide to trigger carrier aggregation for the UE. Therefore, the carrier setup is setup faster.

One problem may be the fact that additional measurements performed by the UE in such idle mode can have negative impact on the UE idle mode power consumption. However, the time period the UE needs to spend in the connected mode can be shortened, if CA can be configured faster. This may be because the user data rates in a small cell can, typically, be higher than in a macro cell. This may help reducing the overall UE power consumption. However, such assumption may hold only when the idle mode measurements are optimized for the required purpose.

Which carriers and cells to measure during idle mode, especially when measurements are triggered by a system information block (e.g. SIBS), is something which is currently not specified. For example, it has only been proposed that a UE can be asked via SIB to measure up to three inter-frequency carriers during IDLE mode, similar to what the current requirements are for measurements required for reselections. This does not address efficiently the problem of optimizing idle mode measurements.

Therefore, more efficient solutions to minimize the UE measurement burden and directing the measurements to correct carriers and cells is needed. This is because the assumption of a positive UE power consumption gain may only be true in case the measurements are limited in time and targeted at the correct cells on correct carriers. Although one proposal to the problem may include that a network, knowing the capabilities of the UE, instructs the UE to measure only relevant cells/carriers. However, when the UE is in the idle mode, the network may not perform such instructing and/or may not know the capabilities of the UE.

In one example embodiment, to at least partially address the above problems, it is proposed that the UE (such as UE 120) may only perform measurements for early reporting on carriers which the UE can aggregate with the serving cell on which access is being performed. In this manner, the time required for the radio measurements in idle mode is reduced. Or alternatively, the UE may more frequently measure carriers it can aggregate, e.g. if it is alternating measurements between carriers (this may lead to more accurate measurement of those carriers the UE can aggregate with the serving cell). Further, the signaling overhead of sending the measurement results is reduced. Also, the processing time at the network to process the measurement results is reduced because only relevant cells/carriers are reported to the network.

Figure 3:
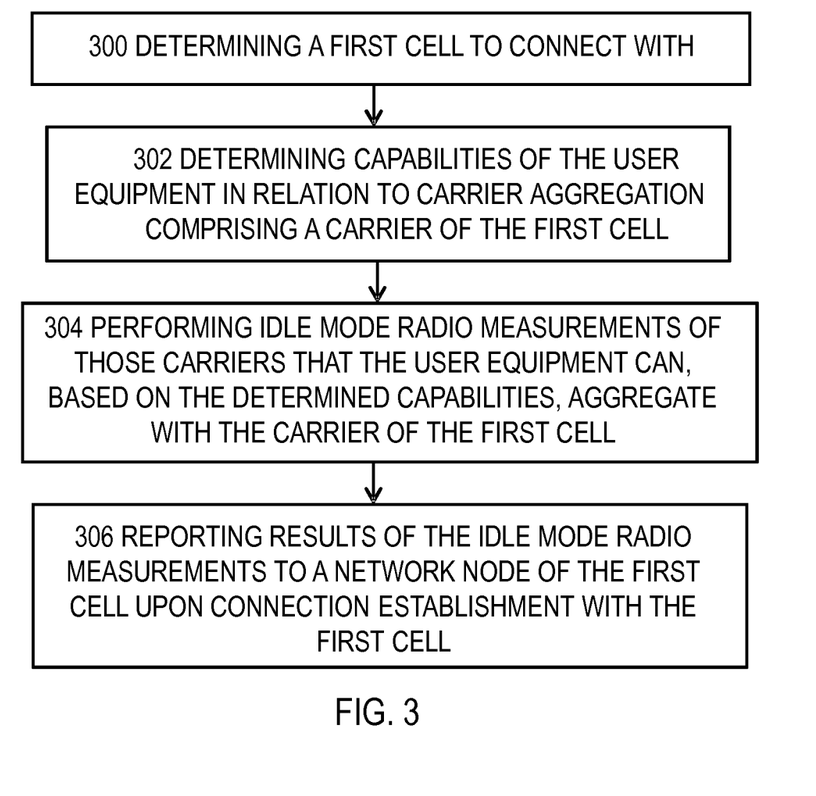
FIGS. 3 and 4 show methods, according to some embodiments.

FIG. 3 depicts an example method. The method may be performed by a user equipment, such as the UE 120. In step 300, the UE may determine a first cell to connect with. The first cell may be a serving cell of the UE, such as the cell 100 of the UE 120. In carrier aggregation, the first cell 100 may be the primary cell (PCell). Cell detection may be based on synchronization signals (such as primary and/or secondary synchronization signals, PSS/SSS) transmitted by a network node of a cell to be detected (e.g. by eNB 110 of cell 100). Based on those (and cell physical cell identity, PCI), the UE may determine where to measure the RSRP, for example. The UE may identify the first cell based on one or more cell identifiers (e.g. PCI) provided in the PSS/SSS. The UE may apply priorities when considering which of possibly many detected cells the UE decides to connect with. Let us here assume the UE decides to connect with the first cell 100. Therefore, cell 100 may be called the serving cell or a to-be serving cell for the UE 100 in the following.

In step 302 the UE may determine capabilities of the UE in relation to carrier aggregation (CA) comprising a carrier of the first cell. That is, the UE may determine which carriers the UE can aggregate with the carrier of the first cell. For example, it is possible that the UE supports certain carriers but not all of those in CA mode. For example, UE might support carriers/bands/cells 100, 101, 102 and 103 in single-carrier mode, but only allow aggregating carriers on bands 100+102 or bands 100+101. Therefore, it may be beneficial to figure out the capabilities regarding carrier aggregation, i.e. which cells/carriers can be aggregated with which cells/carriers. As said, the network may not know the capabilities of the UE since the UE is in the idle mode. The determining by the UE may comprise the UE being configured with information indicating certain CA capabilities, and the UE retrieving from a memory such information. For example, the UE may have, based on physical implementation of the UE, only certain capabilities to support combinations of certain carriers on certain band(s). The CA capabilities of the UE may be limited/affected by e.g. UE's implementation regarding e.g. radio frequency (RF) front end, filters, analog-to-digital conversion (ADC), processing power, etc.). Also software of the UE may pose restrictions on the CA capabilities.

In step 304, the UE performs idle mode radio measurements of those carriers that the user equipment can, based on the determined capabilities, aggregate with the carrier of the first cell. For example, the UE "filters" out those bands from the network configuration where it cannot support CA to reduce the measurement effort and the signalling size of the measurement reports, as will be described later in connection of FIG. 5.

In some embodiments, the UE measures only those carriers the user equipment can, based on the determined capabilities, aggregate with the carrier of the first cell (i.e. measure only valid CA combinations with the first cell). Let us call these carriers as a set of potential CA carriers. These carriers may have potential secondary cells (SCells) for the carrier aggregation. In some other embodiments, the UE may measure the set of potential CA carriers and in addition also some other carriers, as will be described later. The measurements may include e.g. RSRP or reference signal received quality (RSRQ) measurements, for example.

The decision to perform such idle mode radio measurements may be based on a received measurement indication or configuration from the network (e.g. from the control node 110). In an embodiment, the measurement indication may be a dedicated signaling. In an embodiment, the measurement indication may be a broadcast signaling. In an embodiment, the measurement indication may be carried is a system information block (SIB), such as SIBS. In an embodiment, the measurement indication comprises a measurement configuration identifying the carriers to be measured. In an embodiment, the measurement indication does not identify the carriers but is a general indication to perform idle mode radio measurements for detectable cells. In an embodiment, the measurement indication may be received in a system information block. In an embodiment, the measurement indication may be received when the UE enters an idle mode from a connected mode. That is, when the UE is released from a connected mode, the network may configure the UE with a number of carriers to measure in the idle mode, with the purpose of having the UE to report cells during the early phase of any future connection setup. Such measurement configuration of what to measure during idle mode may be conveyed to the UE in a dedicated signalling e.g. in a RRCConnenctionRelease-message. If the UE leaves the cell in idle mode, the UE may get new configuration from system information broadcast after cell reselection in idle mode. In an embodiment, the measurement indication and the discussed idle mode radio measurements are not related to minimization of drive test (MDT) measurements and signaling.

In some example embodiments, the UE measures accordingly to the information (either SIBS information (broadcast information in general) or configured in a dedicated manner) and reports the measurements. Report would include any measurements as instructed, but additionally the UE would indicate in the measurement report whether a reported cell is 'aggregable' i.e. can be aggregated with current serving cell, considering the UE's capabilities.

In one example, the network only configures frequency layers which it knows is a valid CA combination for the UE. UE measures the configured carriers and reports any results during the connection setup phase e.g. for the purpose of enabling early CA setup.

In another example, the UE will only measure configured carriers which is part of a valid CA combination for the UE assuming current serving cell is the PCell. The UE may only be required to measure and/or report cells which forms a valid CA combination with the cell towards which the measurement report is to be sent.

In another example embodiment, in addition to or instead of the serving cell carrier, the UE is indicated one or more other potential serving cell carriers. UE then measures and/or reports candidate SCell carriers (in idle mode) that form a valid CA combination with at least one of the configured potential serving cell carriers.

In step 306, the UE may report results of the idle mode radio measurements to a network node of the first cell upon connection establishment with the first cell. The network node of the first cell may be e.g. the control node 110. The results may thus comprise an indication of signal level and/or signal quality from (at least) the cells that are useable for the UE for carrier aggregation. The results may be indicated e.g. during or after the connection setup phase (for example in the RRCConnectionSetupComplete message). In one embodiment, the UE may be polled by the network (e.g. by the eNB 110) to report the idle mode measurements.

In an embodiment, the carriers that are measured (i.e. the carriers comprised in the set of potential CA carriers) are required to be associated with small cells, such as micro or femto cells, e.g. cells providing hot spot coverage. In an embodiment, the carriers that are measured (i.e. the carriers comprised in the set of potential CA carriers) are required to be associated with non-macro cells. That is, macro cell carriers may be excluded from the list of carriers to be measured and reported to the serving cell upon connection establishment. However, the serving cell 100 may be a macro cell and still be measured either for cell-reselection in idle mode or as part of the early reporting. In an embodiment, the carriers that are measured (i.e. the carriers comprised in the set of potential CA carriers) are required to be associated with potential secondary cells.

In one embodiment, the UE may determine that the eNB 110 supports reporting idle mode radio measurements during the connection establishment. Such early measurement reporting may be indicated in the measurement indication by the potential serving cell in a broadcast receivable by the UE in the coverage area of the cell. That is, the UE may determine the early reporting support of the cell based on an indication in the broadcast, which indicates that the serving cell (e.g. cell 100) is using early measurement reporting based on the UE idle mode radio measurements.

In one embodiment, the early reporting made by the UE 120 may be for aiding an early CA setup for the UE. The reported results of the idle mode radio measurements may thus cause triggering the carrier aggregation by the eNB 110, without the eNB 110 asking for connected mode radio measurements to be performed after the connection is established. However, the early reporting may be used also for other purposes.

In an example, the UE receives carriers to be measured in broadcast information. As the information is broadcast and need to cover UEs generically, the UE could be indicated in a generic manner in the broadcast information that the serving cell is using early measurement reporting based on UE idle mode measurements. This reporting could be for aiding early CA setup in one example but could also be other purposes. For example, such early measurements could be also used in evaluating e.g. the need for handover (for example if the UE reports much better RSRP of another layer, than the 'recently' connected to serving cell). In such case the network could handover UE's connection to the other layer immediately.

In the embodiment where the early reporting is for the purposes of expediting CA setup, the UE may then after connection establishment receive from the eNB 110 an indication indicating that CA is to be triggered for the UE, wherein the CA comprises receiving (and/or transmitting) data over the carrier of the first cell and over one or more of the carriers that were measured during the idle mode radio measurements. The expedition of the CA setup may be because the network obtains knowledge of aggregable carriers at the connection establishment, rather than having to ask for further connected mode measurements of neighboring cells and/or CA capabilities of the UE in connection of the first cell.

Figure 4:
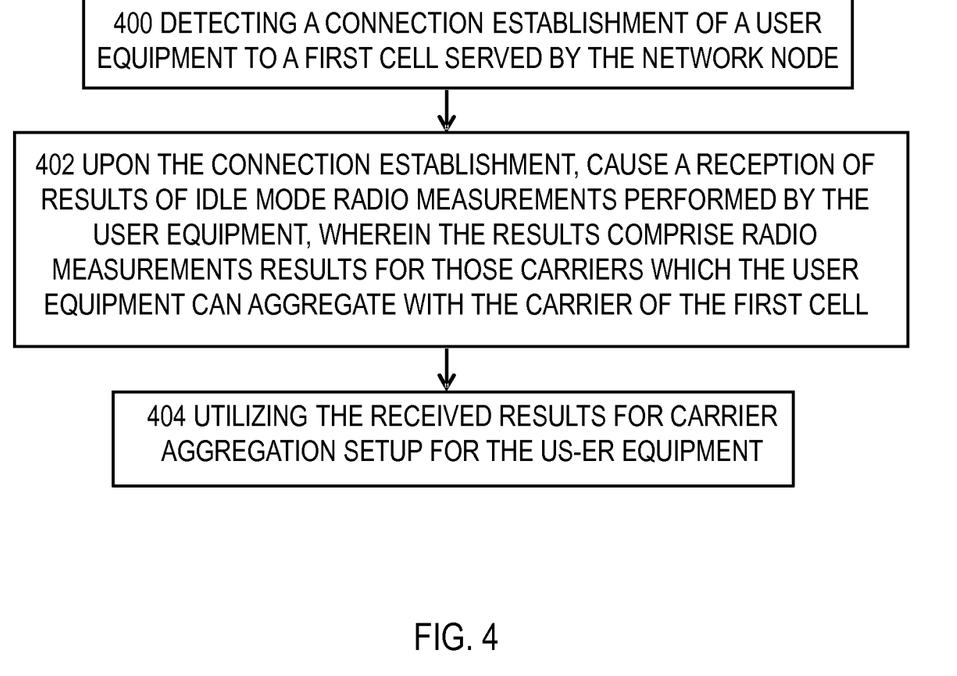

From the network node (such as the eNB/gNB 110) point of view, the proposal may comprise at least the steps of FIG. 4. Accordingly, in step 400 the node 110 may detect a connection establishment of the UE 120 to the first cell served by the network node 110. In step 402, upon the connection establishment, the node 110 receives the results of the idle mode radio measurements performed by the user equipment, wherein the results comprise radio measurements results for those carriers which the user equipment can aggregate with the carrier of the first cell. Finally, in step 404, the node 110 may utilize the received results for carrier aggregation setup for the user equipment.

Let us look at some embodiments within the scope of FIGS. 3 and 4. In one embodiment shown in FIG. 5A, the UE 120 may receive the measurement indication (e.g. configuration) identifying a plurality of carriers (e.g. carriers 101-103) to be measured in the idle mode. These carriers may include carriers that the UE can aggregate with the carrier of the first cell (i.e. carriers belonging to the set of the potential CA carriers/cells—here carriers 101-102) and carriers that the user equipment cannot aggregate with the carrier of the first cell (i.e. carriers not belonging to the set of the potential CA carriers/cells, here carrier 103). In some embodiment, the serving cell 100 is also included in the set of the potential CA carriers/cells) to be measured, although not depicted so here in the examples of FIGS. 5A, 5B and 5C. The network not knowing the capabilities of the UE may broadcast a measurement configuration indicating to measure carriers of cells 100, 101, 102, 103. However, the UE having determined/knowing its own CA combination capabilities may autonomously determine the carriers to be measured by filtering out those carriers from the measurement configuration which the user equipment cannot aggregate with the carrier of the first cell. That is, the UE may filter out the carriers not belonging to the set of potential CA carriers and consequently only perform measurements for early reporting on carriers which the UE can aggregate with the serving cell 100 on which access is performed (e.g. the coming connected mode PCell, which is the cell to which the early measurement report is sent). Once the network (e.g. eNB/gNB 110) of the cell 100 receives the measurements from the UE for bands 101, and 102 (i.e. for the set of potential CA carriers), the control node 110 of the cell 100 knows that only those carriers are possible to be used in CA for that particular UE with the cell 100.

Figure 5A:
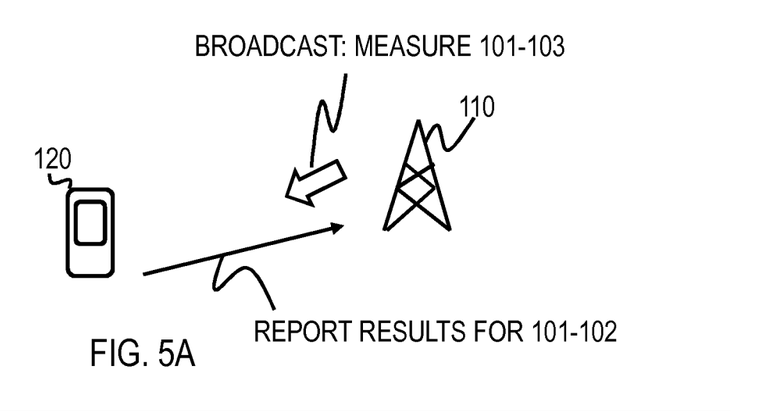
FIGS. 5 and 6 illustrate some examples of determining which carriers to measure and report, according to some embodiments.
Figure 5B:
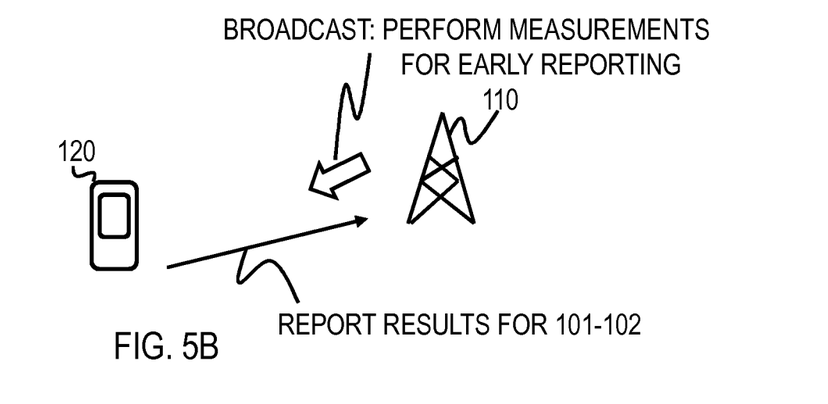

In one embodiment shown in FIG. 5B, the UE may receive a measurement indication indicating to perform idle mode radio measurements. The indication may not comprise any cell/carrier identifiers. The indication may implicitly cover measuring any detected cell by the UE. A cell is detected if the RSRP (or other signal level indicator) is above a preconfigured threshold. In one embodiment, the measurement indication may comprise an indication that the network node 110 supports early reporting of idle mode measurement results. Based on that the UE may derive that the UE can perform idle mode measurements for early reporting. Although being indicated to perform idle more radio measurements without receiving specific carrier/cell identifiers, the UE may autonomously determine which cells are to be measured based on the determined capabilities such that only those carriers that the user equipment can aggregate with the carrier of the first cell are measured. Here in this example embodiment those carriers are carriers 101-102. Once the network (e.g. eNB/gNB 110) receives the measurements from the UE for bands 101, and 102 (i.e. for the set of potential CA carriers), the control node 110 of cell 100 knows that only those carriers are possible to be used in CA for that particular UE with the cell 100.

In an embodiment, the autonomous determination in the examples of FIGS. 5A and/or 5B comprises determining the carriers to measure based on general network configuration and/or the UE's own capability with respect to at least one of the following: carrier aggregation (CA), dual connectivity (DC), EN-DC, which refers to the user equipment being connected to LTE and 5G. For example, the UE may only measure carriers which are part of a valid CA combination for the UE assuming current serving cell 100 is/will be the PCell. In another example, the UE may only measure carriers which are part of a valid CA combination for the UE assuming current serving cell 100 is/will be the SCell. The UE could for example report potential target cells. With this method, the UE could for example, determine which carriers to measure, and could for example use information of which carriers the network has last used for CA configuration.

In an embodiment, the UE determines the carrier frequency layers to be measured according to a new serving cell, e.g. on another carrier frequency, according to what is a valid CA combination for the UE with the new serving cells and the configured carriers.

In an embodiment, the autonomous determination in the examples of FIGS. 5A and/or 5B comprises determining the carriers to be measured based on broadcasted carrier information (e.g. SIB of the cell), which includes information of the to-be serving cell 100, such as information for accessing the (serving) cell, such as the system bandwidth, random access parameters, etc.

In an embodiment the autonomous determination in the examples of FIGS. 5A and/or 5B comprises utilizing information of at least one carrier aggregation configuration used by the user equipment within a past predetermined period of time. In other words, the UE may determine which carriers to measure by taking into account information of which carriers the network has last used for CA configuration. In an embodiment, the UE may be configured to discard this information when the UE has reselected to another cell and establishes connection with the other cell, instead of the cell with which the CA configuration was used. In an embodiment, the UE may apply the information of the at least one CA configuration as long as the UE establishes connection with the cell A or with a neighboring cell of the cell A, wherein cell A is the cell with which the particular CA configuration was used.

Figure 5C:
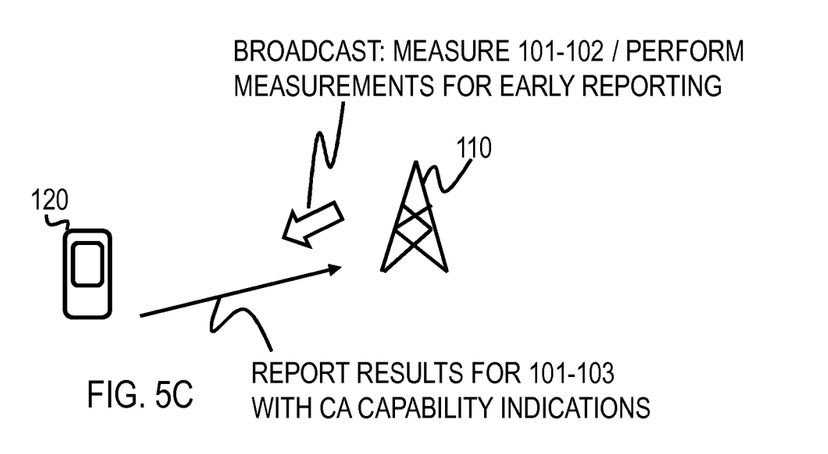

In one embodiment shown in FIG. 5C, the UE may receive a measurement indication (e.g. configuration) identifying a plurality of carriers (e.g. 101-103) to be measured in idle mode, wherein the measurement configuration comprises carriers (101-102) that the user equipment can aggregate with the carrier of the first cell and carriers (103) that the user equipment cannot aggregate with the carrier of the first cell. However, unlike in embodiments of FIGS. 5A and 5B, here the UE may measure accordingly to the received measurement configuration and report the measurements results to the to-be serving cell 100. Here, the UE may advantageously include in the results an indication whether or not the user equipment can aggregate a given measured carrier (101-103) with the carrier of the first cell (100). Such "aggregable or not" indication may be based on the UE capabilities determined in step 302.

In one embodiment, the UE receives a measurement indication (e.g. configuration) indicating a plurality of cells to measure when performing the idle mode radio measurements, wherein the measurement configuration comprises only those carriers (101-102) that the user equipment can use for the carrier aggregation with the first cell (100). That is, the network may only configure frequency layers (carriers) which the network knows belongs to a valid CA combination for the UE. Accordingly, the UE measure according to the indicated measurement configuration and continue by reporting the results during the connection setup phase, e.g. for the purpose of enabling early CA setup. This embodiment may assume the network node 110 is aware of the CA capabilities of the UE.

In this way, the UE may be configured with an indication (such as a broadcasted indication) indicating that the network supports early measurement reporting of idle mode measurements by the UE. Alternatively, the or the UE may be preconfigured with cell IDs supporting such early measurement reporting. Based on the indication/knowledge and optionally a dedicated or broadcasted list carrier frequencies (e.g. measurement configuration), the UE may only measure and report measurement for carriers which forms a valid CA combination with the cell towards which the early measurement report is to be sent. In case no list of carrier frequencies is given to the UE, the UE may measure and report based on its own CA and measurement capabilities. It may be noted that measurement capabilities (e.g. can the UE measure on certain bands or not) may be different from UE's capability to aggregate those in CA.

In an embodiment, the UE may measure and possibly report cells based on the broadcasted carrier information and the UE e.g. CA capability such that only cells (or carriers) which are part of a valid CA combination for the UE would be measured and/or reported.

Normally, the UE can measure and report also cells it could not support in CA in combination with the current serving cell. This would cause unnecessary delay and overhead in measurements of the other carriers that UE would support, as the measurement effort is distributed between measured carriers. Further, the UE does not normally measure any extra carriers. It just measures the ones it has to measure based on any measurement indication. Since it cannot know exactly what eNB intends to do with the measurement results, the normal UE action would be to measure all carriers indicated by NW. However, owing to the described proposal, it may be ensured that 1) UE does not measure too many carriers and 2) the network can indicate even more measurement IDs to the UE, trusting the UEs report only the relevant information. E.g. the eNB might broadcast more information than any single UE needs to or can use. As an example, it is possible the eNB supports e.g. five carriers, but a given UE only supports two carriers in CA, even if it supported single carrier operation in each of the NW-indicated five carriers. Therefore, NW might want to broadcast all of its carriers but UEs may advantageously filter out those where CA is not possible.

Figure 6:
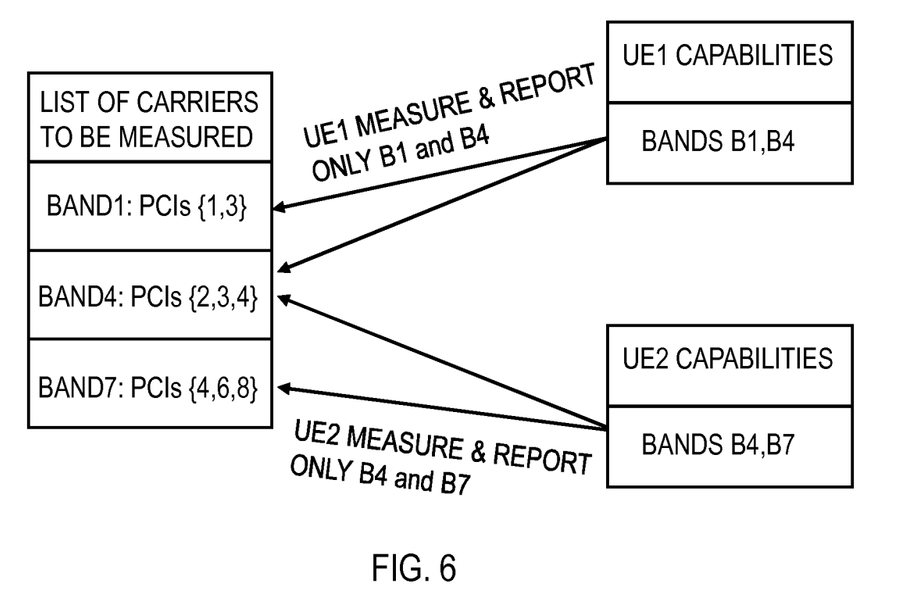

When considering the proposal from the point of view of two UEs, FIG. 6 shows that the UEs may both perform and report the idle mode radio measurements. However, depending on the capabilities of the UE, the measurements performed may vary. As shown in the Figure, UE1 and UE2 support different band combinations, so even when the measurement configuration broadcasted to the UEs is for the same bands (B1, B4 and B7), the UEs will report only those bands that they support for the CA. I.e. the UE1 measures and reports only B1 and B4, where the UE2 measures and reports only B4 and B7. Term PCI in FIG. 6 denotes physical cell identifier, and in the figure PCI may indicate which are the cell IDs that are (on carriers) on the corresponding bands. The UE may determine a PCI of any detected cell based on the PSS and SSS, for example. In FIG. 6, band #1 having PCIs 1 and 3 means that cells with PCI 1 and 3 operate on carriers that are on the same band (for example, they could be on the same carrier).

Figure 7:
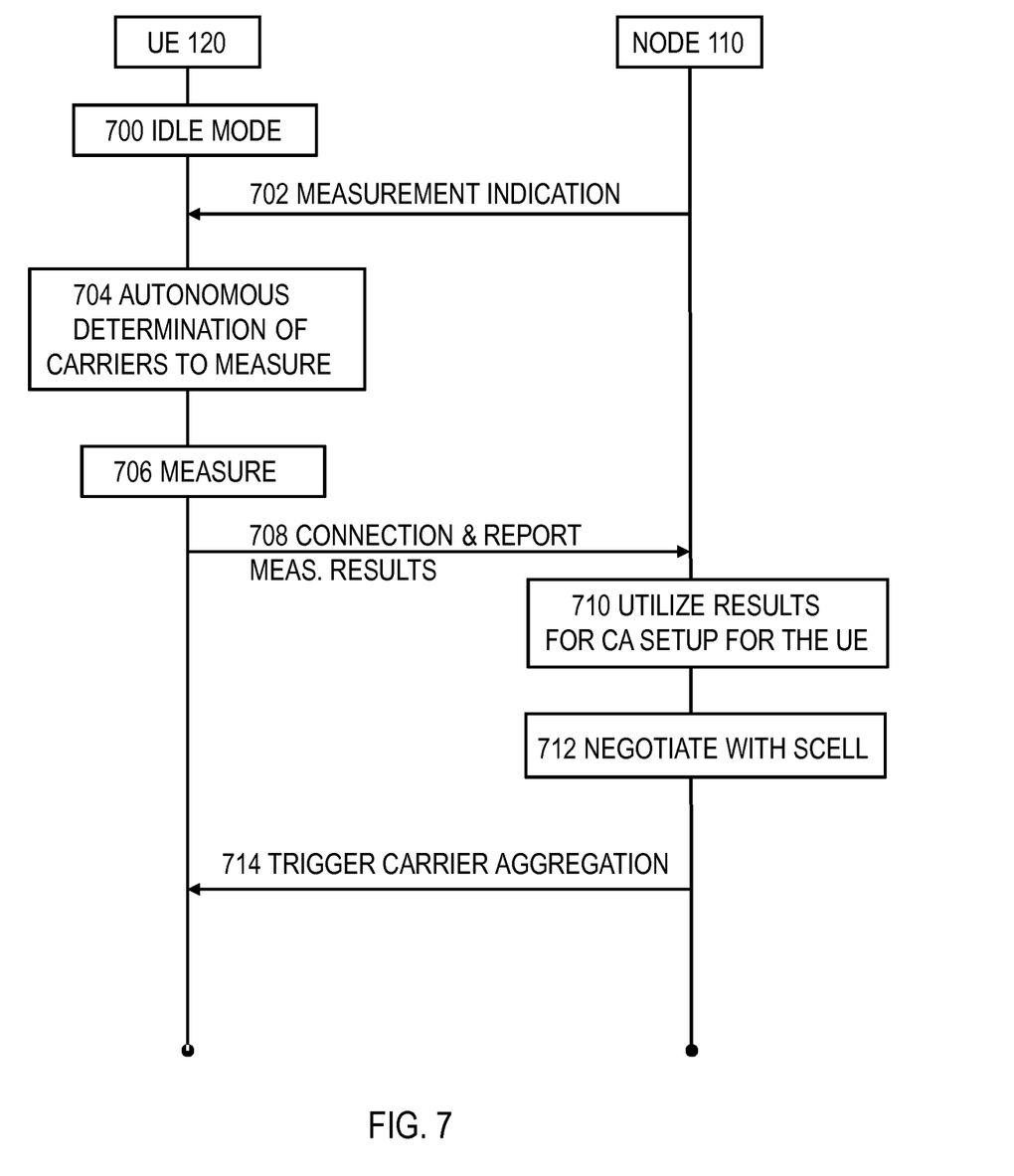
FIG. 7 shows a flow diagram, according to an embodiment.

Let us look at some aspects of the proposal also in form of a signaling flow diagram presented in FIG. 7. In step 700 the UE is or enters the idle mode/state (i.e. it releases RRC connection with the previous serving cell). In step 702 the network node 110 broadcasts a measurement indication to the UE. The measurement indication may be the measurement configuration discussed above, for example, or it may be an indication of network node 110 supporting early measurement reporting, as also discussed above. In step 704 the UE autonomously (i.e. without a request/indication from the network node 110) determines which carriers to measure based on UE capabilities in connection with the to-be-serving cell (which may be different from the one the UE was previously connected to). The determination may comprise adjustment of any received measurement configuration. In step 706 the UE performs the measurements. Upon connection to the serving cell (cell 100 in this example) in step 708, the UE also makes the early reporting of the idle mode measurements. In step 710 utilizes the received measurement results for carrier aggregation setup, i.e. the node 110 may determine which carriers the UE supports for carrier aggregation with the serving cell 100 (e.g. which frequency bands belong to valid CA combinations for this particular UE 120). The node 110 may then select at least one Scell for the carrier aggregation. The setup of the CA may include negotiation with selected secondary cell for the CA in step 712. In step 714, the node 110 may inform the UE 120 about CA triggering for the UE. The informing may indicate which cell is the Scell for the CA (assuming the serving cell 100 is the Pcell). However, the roles of Scell and Pcell may also be vice versed in some other embodiments.

Figure 8:
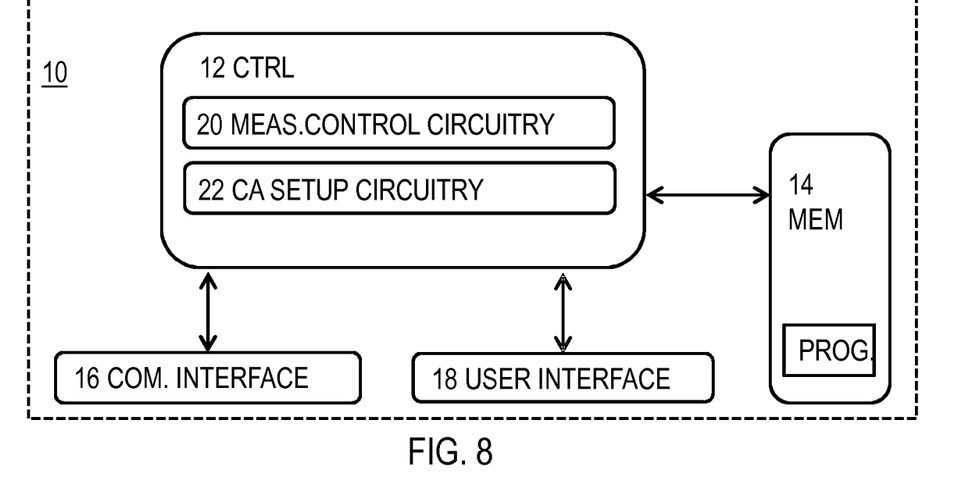
FIGS. 8 and 9 illustrate apparatuses, according to some embodiments.

An embodiment, as shown in FIG. 8, provides an apparatus 10 comprising a control circuitry (CTRL) 12, such as at least one processor, and at least one memory 14 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor based memory devices, flash memory, magnetic memory devices and systems, optical memory devices and systems, fixed memory and removable memory.

In an embodiment, the apparatus 10 may be or be comprised in a network node, such as in gNB/gNB-CU/gNB-DU of 5G or in eNB of EUTRAN. In an embodiment, the apparatus 10 is or is comprised in the network node 110. The apparatus may be caused to execute the functionalities of some of the above described processes, such as the steps of FIG. 4.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 10 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be located in a same entity communicating via a wired connection, etc. It should be understood that the edge cloud or edge cloud server may serve a plurality of radio nodes or a radio access networks. In an embodiment, at least some of the described processes may be performed by the central unit. In another embodiment, the apparatus 10 may be instead comprised in the distributed unit, and at least some of the described processes may be performed by the distributed unit.

In an embodiment, the execution of at least some of the functionalities of the apparatus 10 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 10 controls the execution of the processes, regardless of the location of the apparatus and regardless of where the processes/functions are carried out.

The apparatus may further comprise communication interface (TRX) 16 comprising hardware and/or software for realizing communication connectivity according to one or more communication protocols. The TRX may provide the apparatus with communication capabilities to access the radio access network, for example. The apparatus may also comprise a user interface 18 comprising, for example, at least one keypad, a microphone, a touch display, a display, a speaker, etc. The user interface may be used to control the apparatus by the user.

The control circuitry 12 may comprise a measurement control circuitry 20 e.g. for determining the content of the measurement indication, such as the content of the broadcasted measurement indication to the UEs, according to any of the embodiments. The control circuitry 12 may also comprise a CA setup circuitry 22 for setting up the carrier aggregation for the UE based on the received early measurements reporting.

Figure 9:
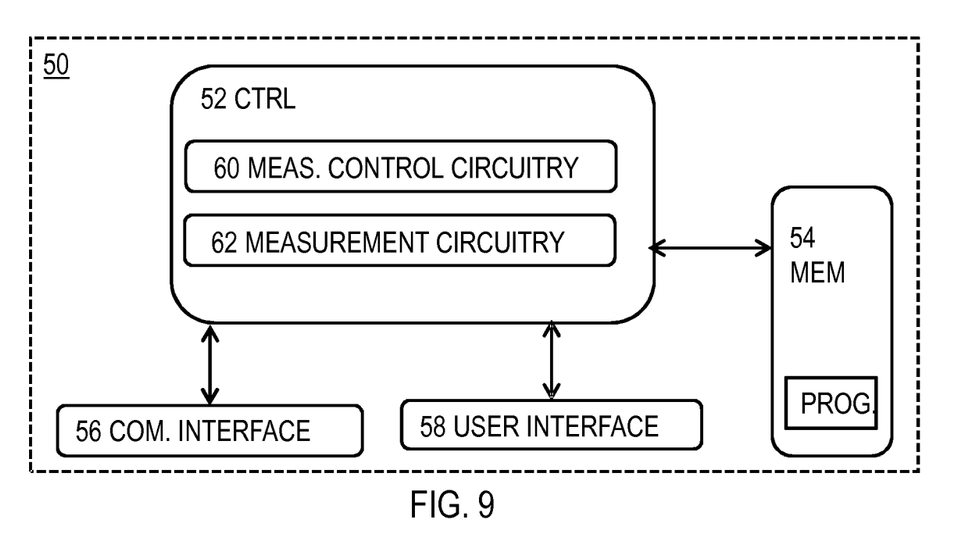

An embodiment, as shown in FIG. 9, provides an apparatus 50 comprising a control circuitry (CTRL) 52, such as at least one processor, and at least one memory 54 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor based memory devices, flash memory, magnetic memory devices and systems, optical memory devices and systems, fixed memory and removable memory.

In an embodiment, the apparatus 50 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly.

The apparatus may further comprise communication interface (TRX) 56 comprising hardware and/or software for realizing communication connectivity according to one or more communication protocols. The TRX may provide the apparatus with communication capabilities to access the radio access network, for example. The apparatus may also comprise a user interface 58 comprising, for example, at least one keypad, a microphone, a touch display, a display, a speaker, etc. The user interface may be used to control the apparatus by the user.

The control circuitry 52 may comprise a measurement control circuitry 60 for autonomously determining which carries/cells to measure, according to any of the embodiments. The control circuitry 52 may further comprise a measurement circuitry 62 for measuring and causing a reporting of the measurement results, according to any of the embodiments.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Following is a list of some aspects of the invention.

According to a first aspect, there is provided a method comprising: determining a first cell to connect with; determining capabilities of the user equipment in relation to carrier aggregation comprising a carrier of the first cell; performing idle mode radio measurements of those carriers that the user equipment can, based on the determined capabilities, aggregate with the carrier of the first cell; and reporting results of the idle mode radio measurements to a network node of the first cell upon connection establishment with the first cell.

Various embodiments of the first aspect may comprise at least one feature from the following bulleted list:

- Determining that the network node of the first cell supports reporting idle mode radio measurements during the connection establishment.
- The reported results of the idle mode radio measurements cause triggering the carrier aggregation by the network node of the first cell, without the network node of the first cell asking for connected mode radio measurements to be performed.
- Causing a reception, from the network node of the first cell, of an indication indicating that a carrier aggregation is to be triggered for the user equipment, wherein the carrier aggregation comprises receiving data over the carrier of the first cell and over one or more of the carriers that were measured during the idle mode radio measurements.
- Causing a reception of a measurement indication identifying a plurality of carriers to be measured in idle mode, wherein the measurement indication comprises carriers that the user equipment can aggregate with the carrier of the first cell and carriers that the user equipment cannot aggregate with the carrier of the first cell; and autonomously determining the carriers to be measured by filtering out those carriers from the measurement configuration which the user equipment cannot, based on the determined capabilities, aggregate with the carrier of the first cell.
- Causing a reception of a measurement indication identifying a plurality of carriers to be measured in idle mode, wherein the measurement indication comprises carriers that the user equipment can aggregate with the carrier of the first cell and carriers that the user equipment cannot aggregate with the carrier of the first cell; and autonomously determining the carriers to be measured by filtering out those carriers from the measurement configuration which the user equipment cannot, based on the determined capabilities, aggregate with the carrier of the first cell.
- Causing a reception of a measurement indication indicating to perform idle mode radio measurements; and autonomously determining the cells to be measured based on the determined capabilities such that only those carriers that the user equipment can aggregate with the carrier of the first cell are measured.
- The autonomous determination comprises utilizing information of at least one carrier aggregation configuration used by the user equipment within a past predetermined period of time.
- Causing a reception of a measurement indication identifying a plurality of carriers to be measured in idle mode, wherein the measurement indication comprises carriers that the user equipment can aggregate with the carrier of the first cell and carriers that the user equipment cannot aggregate with the carrier of the first cell; performing the measurements according to the received measurement configuration; and including in the results of the idle mode radio measurements an indication whether or not the user equipment can aggregate a given measured carrier with the carrier of the first cell.
- The measurement indication is received in a system information block.

Those carriers that the user equipment can, based on the determined capabilities, aggregate with the carrier of the first cell are required to be associated with other cells than macro cells.

According to a second aspect, there is provided a method comprising detecting a connection establishment of a user equipment to a first cell served by the network node; upon the connection establishment, cause a reception of results of idle mode radio measurements performed by the user equipment, wherein the results comprise radio measurements results for those carriers which the user equipment can aggregate with the carrier of the first cell; and utilizing the received results for carrier aggregation setup for the user equipment.

Various embodiments of the second aspect may comprise at least one feature from the following bulleted list:

Causing a broadcast of measurement indication indicating that the network node supports receiving results of idle mode radio measurements during the connection establishment, without identifying the carriers to be measured in the broadcasted measurement indication.

Causing a broadcast of measurement indication identifying a plurality of carriers to be measured in the idle mode, wherein the measurement indication comprises carriers that the user equipment can aggregate with the carrier of the first cell and carriers that the user equipment cannot aggregate with the carrier of the first cell.

According to a third aspect, there is provided an apparatus, comprising: at least one processor and at least one memory including a computer program code, wherein the at least one memory and the computer program code are configured, with the at least one processor, to cause a user equipment to perform: determine a first cell to connect with; determine capabilities of the user equipment in relation to carrier aggregation comprising a carrier of the first cell; perform idle mode radio measurements of those carriers that the user equipment can, based on the determined capabilities, aggregate with the carrier of the first cell; and report results of the idle mode radio measurements to a network node of the first cell upon connection establishment with the first cell.

Various embodiments of the third aspect may comprise at least one feature from the bulleted list under the first aspect.

According to a fourth aspect, there is provided an apparatus, comprising: at least one processor and at least one memory including a computer program code, wherein the at least one memory and the computer program code are configured, with the at least one processor, to cause a network node to perform: detect a connection establishment of a user equipment to a first cell served by the network node; upon the connection establishment, receive results of idle mode radio measurements performed by the user equipment, wherein the results comprise radio measurements results for those carriers which the user equipment can aggregate with the carrier of the first cell; and utilize the received results for carrier aggregation setup for the user equipment.

Various embodiments of the fourth aspect may comprise at least one feature from the bulleted list under the second aspect.

According to a fifth aspect, there is provided a computer program product embodied on a distribution medium readable by a computer and comprising program instructions which, when loaded into an apparatus, execute the method according to any of aspects 1 or 2.

According to a sixth aspect, there is provided a computer program product comprising program instructions which, when loaded into an apparatus, execute the method according to any of aspects 1 or 2.

According to a seventh aspect, there is provided an apparatus, comprising means for performing the method according to any of aspects 1 to 2.

According to an eight aspect, there is provided a computer system, comprising one or more processors; at least one data storage, and one or more computer program instructions to be executed by the one or more processors in association with the at least one data storage for carrying out a process according to any of aspects 1 or 2.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
   determining, by a user equipment, a first cell to connect with;
   determining capabilities of the user equipment in relation to carrier aggregation comprising a carrier of the first cell;
   receiving, from a network node of the first cell, a measurement indication identifying a plurality of carriers to be measured in idle mode, wherein the measurement indication comprises carriers that the user equipment can aggregate with the carrier of the first cell and carriers that the user equipment cannot aggregate with the carrier of the first cell;
   autonomously determining the carriers to be measured by filtering out those carriers from the measurement indication which the user equipment cannot, based on the determined capabilities, aggregate with the carrier of the first cell;
   performing idle mode radio measurements of the determined carriers to be measured; and
   reporting results of the idle mode radio measurements to the network node of the first cell upon connection establishment with the first cell.

2. The method of claim 1, further comprising: determining that the network node of the first cell supports reporting idle mode radio measurements during the connection establishment.

3. The method of claim 1, further comprising:
   causing a reception, from the network node of the first cell, of an indication indicating that a carrier aggregation is to be triggered for the user equipment, wherein the carrier aggregation comprises receiving data over the carrier of the first cell and over one or more of the carriers that were measured during the idle mode radio measurements.

4. The method of claim 1, further comprising:
   causing a reception of a measurement indication indicating to perform idle mode radio measurements; and
   autonomously determining the cells to be measured based on the determined capabilities such that only those carriers that the user equipment can aggregate with the carrier of the first cell are measured.

5. The method of claim 1, wherein those carriers that the user equipment can, based on the determined capabilities, aggregate with the carrier of the first cell are required to be associated with other cells than macro cells.

6. The method of claim 1, wherein the reported results of the idle mode radio measurements cause triggering the carrier aggregation by the network node of the first cell, without the network node of the first cell asking for connected mode radio measurements to be performed.

7. The method of claim 1, wherein the autonomous determining comprises utilizing information of at least one carrier aggregation configuration used by the user equipment within a past predetermined period of time.

8. The method of claim 1, wherein the measurement indication is received in a system information block.

9. The method of claim 1, wherein the user equipment is operating according to the long term evolution or according to the long term evolution advanced, or according to new radio, 5G.

10. An apparatus, comprising:
  at least one processor and at least one memory including a computer program code, wherein the at least one memory and the computer program code are configured, with the at least one processor, to cause the apparatus to:
  determine a first cell to connect with;
  determine capabilities of a user equipment in relation to carrier aggregation comprising a carrier of the first cell;
  receive, from a network node of the first cell, a measurement indication identifying a plurality of carriers to be measured in idle mode, wherein the measurement indication comprises carriers that the user equipment can aggregate with the carrier of the first cell and carriers that the user equipment cannot aggregate with the carrier of the first cell;
  autonomously determine the carriers to be measured by filtering out those carriers from the measurement indication which the user equipment cannot, based on the determined capabilities, aggregate with the carrier of the first cell;
  perform idle mode radio measurements of the determined carriers to be measured; and
  report results of the idle mode radio measurements to the network node of the first cell upon connection establishment with the first cell.

11. The apparatus of claim 10, wherein the at least one memory and the computer program code are configured, with the at least one processor, to cause the apparatus further to perform:
  determine that the network node of the first cell supports reporting idle mode radio measurements during the connection establishment.

12. The apparatus of claim 10, wherein the reported results of the idle mode radio measurements cause triggering the carrier aggregation by the network node of the first cell, without the network node of the first cell asking for connected mode radio measurements to be performed.

13. The apparatus of claim 10, wherein the at least one memory and the computer program code are configured, with the at least one processor, to cause the apparatus further to:
  cause a reception, from the network node of the first cell, of an indication indicating that a carrier aggregation is to be triggered for the user equipment, wherein the carrier aggregation comprises receiving data over the carrier of the first cell and over one or more of the carriers that were measured during the idle mode radio measurements.

14. The apparatus of claim 10, wherein the at least one memory and the computer program code are configured, with the at least one processor, to cause the apparatus further to:
  receive a measurement indication indicating to perform idle mode radio measurements; and
  autonomously determine the cells to be measured based on the determined capabilities such that only those carriers that the user equipment can aggregate with the carrier of the first cell are measured.

15. The apparatus of claim 10, wherein the autonomous determination comprises utilizing information of at least one carrier aggregation configuration used by the user equipment within a past predetermined period of time.

16. The apparatus of claim 10, wherein the measurement indication is received in a system information block.

17. The apparatus of claim 10, wherein those carriers that the user equipment can, based on the determined capabilities, aggregate with the carrier of the first cell are required to be associated with other cells than macro cells.

18. The apparatus of claim 10, wherein the apparatus is a user equipment and the apparatus is operating according to the long term evolution or according to the long term evolution advanced, or according to new radio, 5G.

\* \* \* \* \*